United States Patent [19]
Motohashi et al.

[11] Patent Number: 5,458,917
[45] Date of Patent: Oct. 17, 1995

[54] CONTINUOUS SURFACE TREATING METHOD AND APPARATUS WITH INLINE CENTRIFUGAL SEPARATOR

[75] Inventors: Tsutomu Motohashi; Masahiro Kojima, both of Oyama; Fujio Mikami, Yokohama; Kiyotada Yasuhara, Yokohama; Kageki Fujimoto, Yokohama, all of Japan

[73] Assignees: Showa Aluminum Corporation; Nippon Paint Co., Ltd., both of Osaka, Japan

[21] Appl. No.: 78,034

[22] Filed: Jun. 18, 1993

[30] Foreign Application Priority Data

Jun. 26, 1992 [JP] Japan .................... 4-191321

[51] Int. Cl.$^6$ ............ B05D 3/12; C23C 22/00; B05C 11/02; B05C 13/02
[52] U.S. Cl. .......... 427/240; 427/299; 427/307; 427/388.1; 427/388.4; 427/435; 118/52; 118/409; 118/500; 148/240; 148/275
[58] Field of Search ................ 427/240, 307, 427/435, 388.1, 388.4, 299; 118/52, 54, 500; 148/240, 275; 156/665

[56] References Cited

U.S. PATENT DOCUMENTS

| | | | |
|---|---|---|---|
| 733,378 | 7/1903 | Engel | 118/52 |
| 1,327,273 | 1/1920 | Eskilon | 118/52 |
| 1,525,255 | 2/1925 | Starks | 118/52 |
| 2,387,300 | 10/1945 | Ronci | 118/52 |
| 3,257,732 | 6/1966 | Webster | 34/8 |
| 4,421,789 | 12/1983 | Kaneko et al. | 427/409 |
| 4,888,213 | 12/1989 | Hesterberg | 118/52 |

FOREIGN PATENT DOCUMENTS

| | | |
|---|---|---|
| 694618 | 7/1967 | Belgium . |
| 3319544 | 12/1984 | Germany . |
| 59-76557 | 5/1984 | Japan . |
| 60-7950 | 1/1985 | Japan . |
| 1314158 | 12/1989 | Japan . |
| 326381 | 2/1991 | Japan . |
| 1193593 | 6/1970 | United Kingdom . |

OTHER PUBLICATIONS

Patent Abstracts of Japan, vol. 005, No. 049 (C-049) 8 Apr. 1981 & JP-A-56 003 684 (Nippon Enbairo Kogyo KK) 14 Jan. 1981.

*Primary Examiner*—Janyce Bell
*Attorney, Agent, or Firm*—Sughrue, Mion, Zinn, Macpeak & Seas

[57] ABSTRACT

In a continuous surface treating method and apparatus with an inline centrifugal separator, an object to be treated is contained in a basket and hung from a hanger of an overhead type and a series of surface treatments of the object is carried out by using a continuous conveyer of a power and free type. By using a hanger attach-detach conveyer, the object is moved from a main conveyer to a sub-conveyer and an excessive treating liquid attached to the object in a previous process is separated by using the centrifugal separator. Then, the object is returned from the sub-conveyer to the main conveyer to perform a next process. The surface treating apparatus includes the rotatable basket for containing the object. When the surface treatment of the object such as a heat exchanger or the like is continuously executed in the conveyer line, a bringing of the excessive treating liquid attached to the object in the previous process into a next process can be prevented and the concentration of the treating liquid in a bath can be maintained to a constant value. As a result, the obtained film thickness becomes uniform and the quality of the object can be improved.

19 Claims, 5 Drawing Sheets

CONTINUOUS SURFACE TREATING METHOD AND APPARATUS WITH INLINE CENTRIFUGAL SEPARATOR

BACKGROUND OF THE INVENTION i) Field of the Invention

The present invention relates to a method and apparatus for carrying out a surface treatment of a fabricated heat exchanger such as an evaporator for an air conditioner while the heat exchanger is carried on and moved by a continuous overhead conveyer of a power and free type, and more particularly to a continuous surface treating method and apparatus with an inline centrifugal separator for liquid draining or removal, built in a continuous conveyer line of a power and free type.

ii) Description of the Related Arts

It is already known that it is necessary to improve the hydrophilic property (water-attractive property) when a surface treatment of a heat exchanger is carried out, as disclosed in Japanese Patent Laid-Open No.Hei 1-314158 ("Heat Exchanger, Manufacture Thereof and Surface Treatment Agent Thereof") and No.Hei 3-26381 ("Aluminum Heat Exchanger and Its Producing Method"). In these prior arts, an antimicrobial agent or a water-soluble polymer is used for improving the hydrophilic property. However, in a heat exchanger W, as shown in FIG. 1, a spacing between two adjacent fins Wa is small and a liquid draining property is bad. Hence, it is unavoidable to admix a chemical conversion coating (chromating) liquid in a previous process into a hydrophilic coating liquid bath and a concentration of the hydrophilic coating liquid becomes uneven. Thus, a film thickness is not fixed and the quality is unstable. Further, even when there is no mixing of the chemical conversion coating liquid into the hydrophilic coating liquid, the liquid draining property of the hydrophilic coated film is bad and the film thickness becomes uneven. For example, as a water soluble hydrophilic coating or a hydrophilic coating, a composition comprising, specifically, (a) 0.3–6 weight % of polyvinyl pyrrolidone having a polymerization degree of 10–1000; (b) 1–10 weight % of polyvinyl alcohol having a saponification degree of 80% or more and a polymerization degree of 100–1000, a weight ratio of the component (a) to the component (b), (a)/[(a)+(b)], being in the range of 0.1–0.9; and (c) residual water to make 100% composition, is used.

As a method for improving the liquid draining property of bolts, nuts and the like treated in a surface treating line, a centrifugal separator can be used, as disclosed in Japanese Patent Laid-Open No.Sho 59-76557 ("Centrifugal Separation Device") and No.Sho 60-7950 ("Vessel and Process for Centrifugal Separation").

Conventionally, as a centrifugal separator, a basket or the like for containing objects to be treated is rotated by a motor or the like. After the objects attached with treating liquid in a previous process are put into the basket, the basket is rotated to carry out a centrifugal separation of the treating liquid and the objects with the liquid removed are taken out to sent to a next treating process. The treating liquid centrifugally separated from the objects is drained from the loopholes of the basket and is collected by a liquid collecting container fixed so as to surround the basket.

The mounting and demounting or putting and taking of the objects to be treated into and out of the centrifugal separator require a lot of time and effort. In particular, in the case of a large number of small objects to be treated, this replacing work requires an extreme amount of time and effort and remarkably reduces workability of not only the centrifugal separating process but also the whole treating line.

On the other hand, as a conveying means of the objects to be treated in various treating lines, a continuous trolley conveyer system is used. In this continuous conveyer, chains and the like run on a ceiling of a factory and the objects to be treated are directly carried on hangers hung from the running chains or vessels containing the objects are carried on the hangers so as to convey the objects.

In order to perform the aforementioned "liquid draining or removal" in a treating line having such a continuous trolley conveyor system, the excessive treating liquid is naturally dropped from the objects, or by an air blow or a hot air blow, the liquid removal is forcibly executed. However, by the natural dropping, the efficiency is extremely bad and perfect liquid draining can not be performed. Also, by the air blow or the like, a uniform liquid removal can not be carried out.

SUMMARY OF THE INVENTION

Accordingly, it is a first object of the present invention in view of the aforementioned problems to provide a continuous surface treating method for carrying out a liquid draining or removal of objects to be treated between processes so as not to carry a treating liquid in a previous process into a next process to prevent a mixing of treating liquids and a runoff of the treating liquids in a surface treating line of a heat exchanger or the like by using a continuous conveyer of a power and free type in order to maintain concentrations of the treating liquids in the processes to fixed values and to achieve quality stability of the objects.

It is a second object of the present invention to provide a continuous surface treating apparatus for realizing the surface treating method of the first object.

It is a third object of the present invention to provide a centrifugal separator apparatus for effectively achieving the liquid draining or removal of the objects in the surface treating apparatus of the second object.

It is a fourth object of the present invention to provide a basket for containing the heat exchanger to be set to the centrifugal separator for rotation thereof in the centrifugal separator apparatus of the third object.

In the specification, the term "liquid draining or removal" represents the process in which the superfluous hydrophilic coating liquid is made to flow down from the surface of the coated heat exchanger and is drained or removed while maintaining a sufficient quantity thereof necessary for forming a hydrophilic-coated film.

In order to achieve the aforementioned objects, in accordance with the first aspect of the present invention, there is provided a continuous surface treating method of a fabricated heat exchanger hung from a hanger of an overhead type in processes such as acid dissolution, water washing, and chemical conversion treatment. The water washing and a hydrophilic coating treatment uses a continuous conveyer. The continuous conveyer is a power and free type comprising a main conveyer and a sub-conveyer. The continuous surface treatment method comprises stopping the hanger hanging the heat exchanger after it is moved from the main conveyer to the sub-conveyer, and carrying out a liquid removal by a centrifugal separation while the heat exchanger is rotated. Then, the hanger is returned from the sub-conveyer to the main conveyer by moving the hanger.

In this continuous surface treating method, for example, the object (heat exchanger) is conveyed by the continuous conveyer of the power and free type, and after finishing the process of the water washing, the object is moved from the main conveyer to the sub-conveyer and is stopped at the predetermined position to carry out the liquid removal of the object by the centrifugal separation system. Next, the object is moved from the sub-conveyer to the main conveyer to carry out the next chemical conversion treatment. Hence, the excessive treating liquid attached to the object in the process of the water washing can not be brought into the next chemical conversion treating liquid bath. Similarly, the excessive treating liquid attached to the object in the previous process can not be carried into the hydrophilic coating treating liquid bath, and the concentration of the treating liquid in the bath becomes constant. Hence, the film thickness of the object becomes uniform and the quality of the object is stabilized.

In accordance with the second aspect of the present invention, there is provided a continuous surface treating apparatus for successively carrying out a surface treatment of a fabricated heat exchanger hung from a hanger of an overhead type in processes of acid dissolution, water washing, chemical conversion treatment, and hydrophilic coating treatment by using a continuous conveyer, comprising a continuous conveyer of a power and free type including a main conveyer and a sub-conveyer; a hanger attach-detach conveyer for moving the heat exchanger along the sub-conveyer; positioning stop means for stopping the heat exchanger at a predetermined position; and a centrifugal separating mechanism for carrying out a liquid removal of the heat exchanger by a centrifugal separation while the heat exchanger is rotated.

In this continuous surface treating apparatus, the above-described continuous surface treating method can be effectively realized and it can be prevented from bringing the excessive treating liquid attached to the object in the previous process into the next process.

In accordance with the third aspect of the present invention, there is provided a centrifugal separator apparatus for carrying out a centrifugal separation of an object to be treated in a traveling path of a continuous conveyer of a power and free type, comprising a basket for containing the object, which is hung from the continuous conveyer via a rotary joint mounted in a top end of the basket; a centrifugal separation treating device body for carrying out the centrifugal separation, which is arranged in an opposite position to the basket so as to be detachably connected with the basket, the basket including a concave groove extending in a central axis direction of the basket, the centrifugal separation treating device body including rotary drive means having a rotary shaft to be engaged with the concave groove of the basket and a driver for driving the rotary shaft; liquid collecting means to surround the basket for collecting the liquid separated from the object by the centrifugal separation; and lifting means for lifting the rotary drive means and the liquid collecting means together.

In this centrifugal separator apparatus, the above-described centrifugal separating treatment can be effectively realized, and it can be prevented from bringing the excessive treating liquid attached to the object into the next process. In particular, this centrifugal separator apparatus includes the basket separated from the centrifugal separation treating device body and only the basket is rotated together with the object. Hence, the weight of the rotary part becomes relatively small, and the driving means can be small and light weight. Thus, this system can be readily arranged within the treating line.

In accordance with the fourth aspect of the present invention, there is provided a rotatable basket for containing an object to be treated for use in a centrifugal separation treatment, comprising a casing for containing at least one object, the casing having a cylindrical side wall part composed of a porous material and a bottom part integrally formed with the side wall part; a cylindrical concave groove part extending in a vertical direction from a center of the bottom part of the casing; and a flexible net mounted to an internal surface of the side wall part of the casing for holding the object.

In this basket, first, the object is wrapped by the flexible net and is contained within the basket. The object is stably held within the basket by the flexible net and the turning over of the object within the basket by the centrifugal force can be avoided. Also, the containing operation of the object into the basket can be quickly and readily carried out and, since the stability of the object at the contained time can be improved, the turning over and the damage of the object, the imbalance of the rotation of the basket and the like can be effectively prevented.

The basic structure of the conveyer system of the power and free type can be similar to one employed in various usual treating lines. In the conveyer system of the power and free type, the basket is hung from a moving body such as a hanger or the like via the rotary joint.

The basket is adapted to contain one or a plurality of objects and to carry the objects and at the same time, the basket can be used as the vessel for the centrifugal separating treatment. Hence, the basket has the structure so as to discharge the separated liquid from the object by the centrifugal separation. More specifically, similar to a basket with a steel wall, there are a number of holes or gaps in the wall, or the wall surface of the basket is inclined so that the separated liquid may flow along the wall surface. More preferably, the basket has a structure capable of performing various treatments, while the basket contains the object, in other treating processes along the running continuous conveyer of the power and free type in addition to the centrifugal separating apparatus.

As to the rotary joint, the rotary joint must allow the basket to freely rotate in the horizontal direction while the basket is hung from the hanger of the continuous conveyer and thus various kinds of rotatable joint structures used in the usual mechanical devices can be used.

The centrifugal separation treating device body is equipped in a proper position under the travelling path of the continuous conveyer so that the hangers and the baskets hung from the continuous conveyer may not strike against the centrifugal separation treating device body. The centrifugal separation treating device body includes the rotary drive means and the liquid collecting means and these two means are adapted to be moved up and down by the lifting means. The rotary drive means and the liquid collecting means are positioned in the lower position away from the running basket in their down position. In their up position, the liquid collecting means surrounds the basket and the rotary drive means can drive and rotate the basket.

The rotary drive means of the centrifugal separation treating device body is provided with a drive source such as a motor or the like and an engaging drive mechanism for rotating the basket in the horizontal direction by receiving the rotation force from the drive source and engaging a part of the basket. As the engaging drive mechanism, for example, a central engaging shaft as a rotary shaft to be inserted into a central engaging hole formed in the bottom center of the basket and set pins to be inserted into set pin receiver holes formed on a bottom circle of the basket are formed on a rotary plate for supporting the basket.

As described above, in order to make the rotary drive of the basket by the rotary drive means, the basket is preferably formed with a necessary structure. For ensuring the smooth horizontal rotation of the basket, hold rollers or guide rollers may be preferably provided.

As long as the liquid collecting means of the centrifugal separation treating device body possesses the structure capable of collecting the separated liquid from the rotating object and the basket by the centrifugal force without scattering the separated liquid in the surroundings, the specific shape can be freely changed. The liquid collecting means is so formed, that is, at least the top is opened and it can move in close to the lower part and surround the periphery of the basket. As to a specific structure of the liquid collecting means, for instance, a vessel of a cylindrical or a polygonal cylinder form can be used. By making an inclination to the bottom of the liquid collecting means and providing an outlet in the lower most position of the bottom, the collected liquid can smoothly flow into the outlet and thus the liquid can be collected and returned to the original process.

As the lifting means of the centrifugal separation treating device body, a structure of various lifting mechanisms or devices used for usual mechanical devices such as a table lifter using a rack and a pinion or the like can be used.

The centrifugal separating apparatus according to the present invention can be applied to applications requiring the centrifugal separating treatment in any technical fields such as a coating or painting line and a surface treating line as long as the line uses the continuous conveyer system of the power and free type. The shape and material of the object to be treated and the kinds of the treating liquids can be freely combined. Meeting various applications and purposes, the shape, the structure and the rotation speed of the centrifugal separating apparatus can be freely changed within the present invention. Further, by moving the basket up and down without moving the centrifugal separating apparatus up and down, the objects of the present invention can be achieved.

The continuous conveyer of the power and free type of the present invention can be of a known structure and is comprised of the main conveyer running at the fixed speed by driving by means of the motor and the sub-conveyer of a free rail type arranged along the main conveyer. By separating the hanging clamp from the intermediate position, the object to be treated can be moved from the main conveyer to the sub-conveyer and run at the free speed along the sub-conveyer.

In the surface treating apparatus of the present invention, the hanger attach-detach conveyer is further provided. This hanger attach-detach conveyer can advance the object on the sub-conveyer and stop the object at the predetermined position for carrying out the centrifugal separating treatment. Thereafter, the hanger attach-detach conveyer returns the object from the sub-conveyer to the main conveyer. The return of the object from the sub-conveyer to the main conveyer can be performed, as is well known, by re-combining the temporarily separated hanging clamp again.

The centrifugal separating apparatus according to the present invention is operated as follows.

First, when the basket hung from the continuous conveyer of the power and free type via the rotary joint is positioned above the centrifugal separation treating device body while the basket contains the object attached with the treating liquid in the previous process, the moving continuous conveyer is temporarily stopped to stop the traveling of the basket.

By operating the lifting means of the centrifugal separation treating device body, the liquid collecting means and the rotary drive means are lifted together. Now, the liquid collecting means surrounds the external periphery of the basket and the rotary drive means is engaged with the part of the basket so as to transmit the rotation force of the rotary drive means to the basket. When the rotation force is transmitted from the rotary drive means to the basket, the basket is rotated in the horizontal direction. Since the basket is hung from the continuous conveyer via the rotary joint, while the basket is hung from the continuous conveyer, the basket can be horizontally rotated. By the horizontal rotation of the basket, the treating liquid attached to the object can be separated and the separated liquid is collected in the liquid collecting means surrounding the basket.

When the centrifugal separating treatment is completed, the lifting means is operated to drop the liquid collecting means the and rotary drive means. After the liquid collecting means is dropped below the basket away therefrom, the continuous conveyer is driven again to travel and the basket containing the object is moved to the next process.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
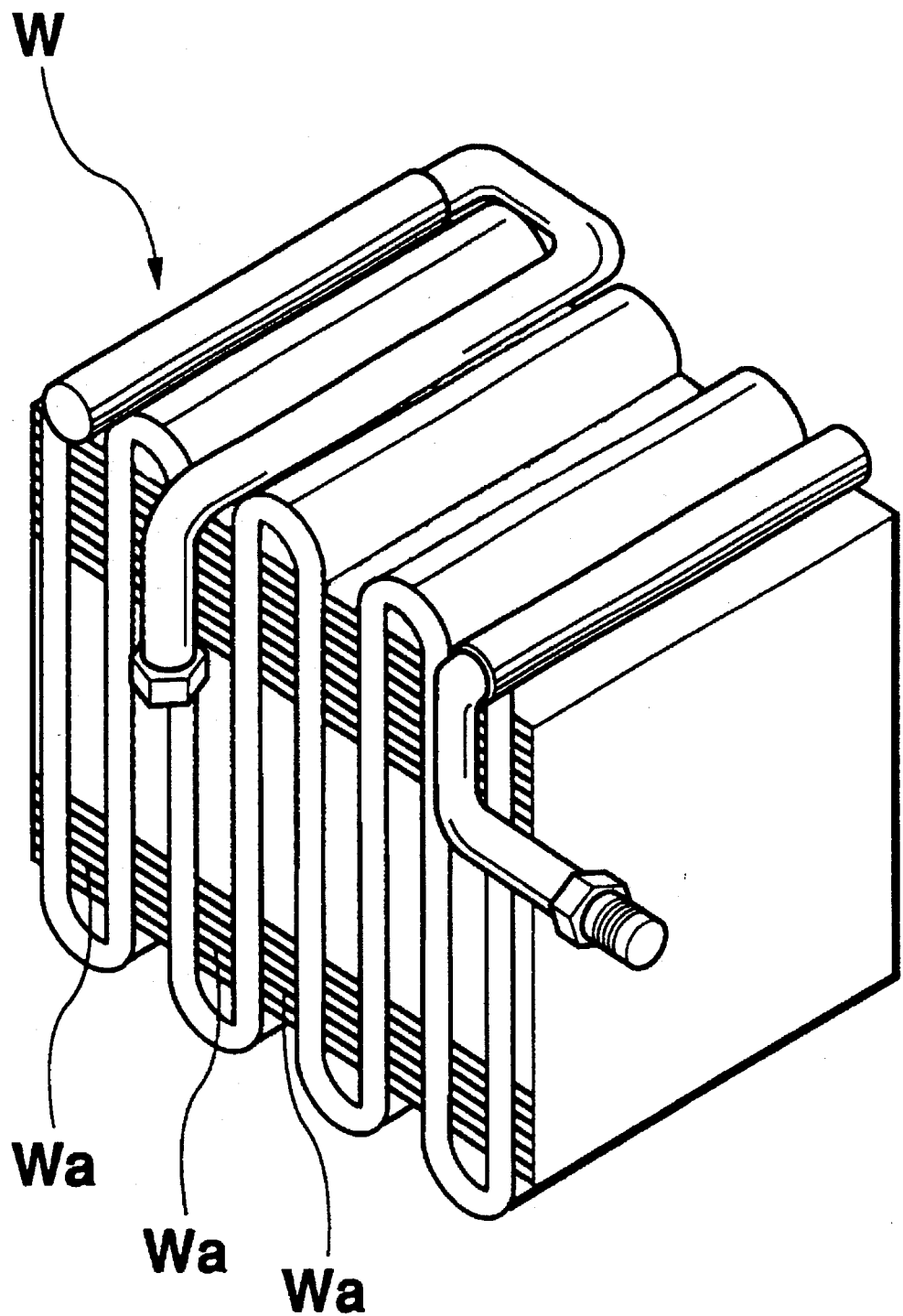
FIG. 1 is a fragmentary perspective view of a conventional heat exchanger.
Figure 2:
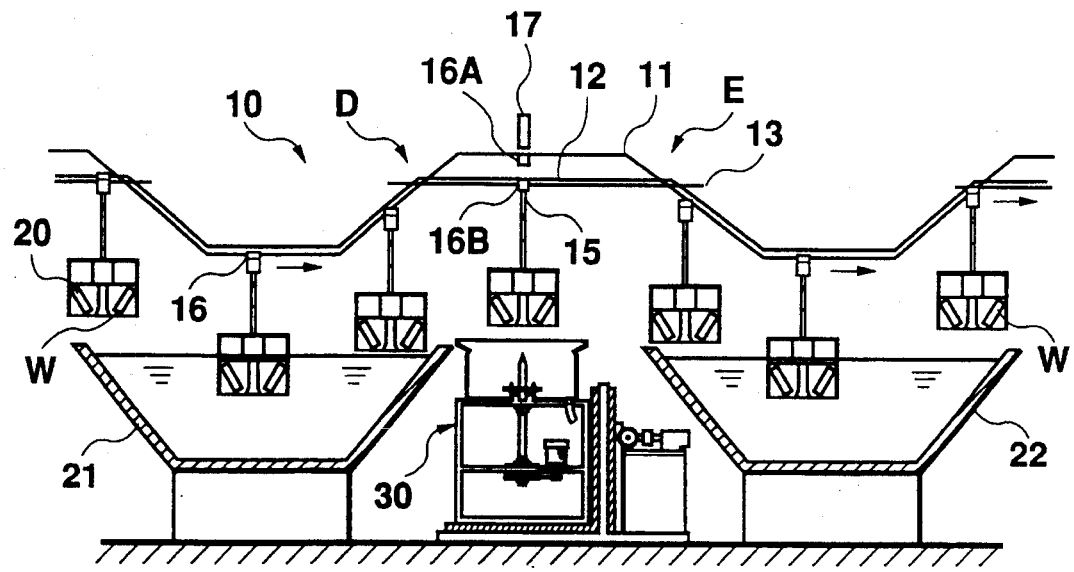
FIG. 2 is a schematic longitudinal cross sectional view of a surface treating apparatus according to the present invention.
Figure 3:
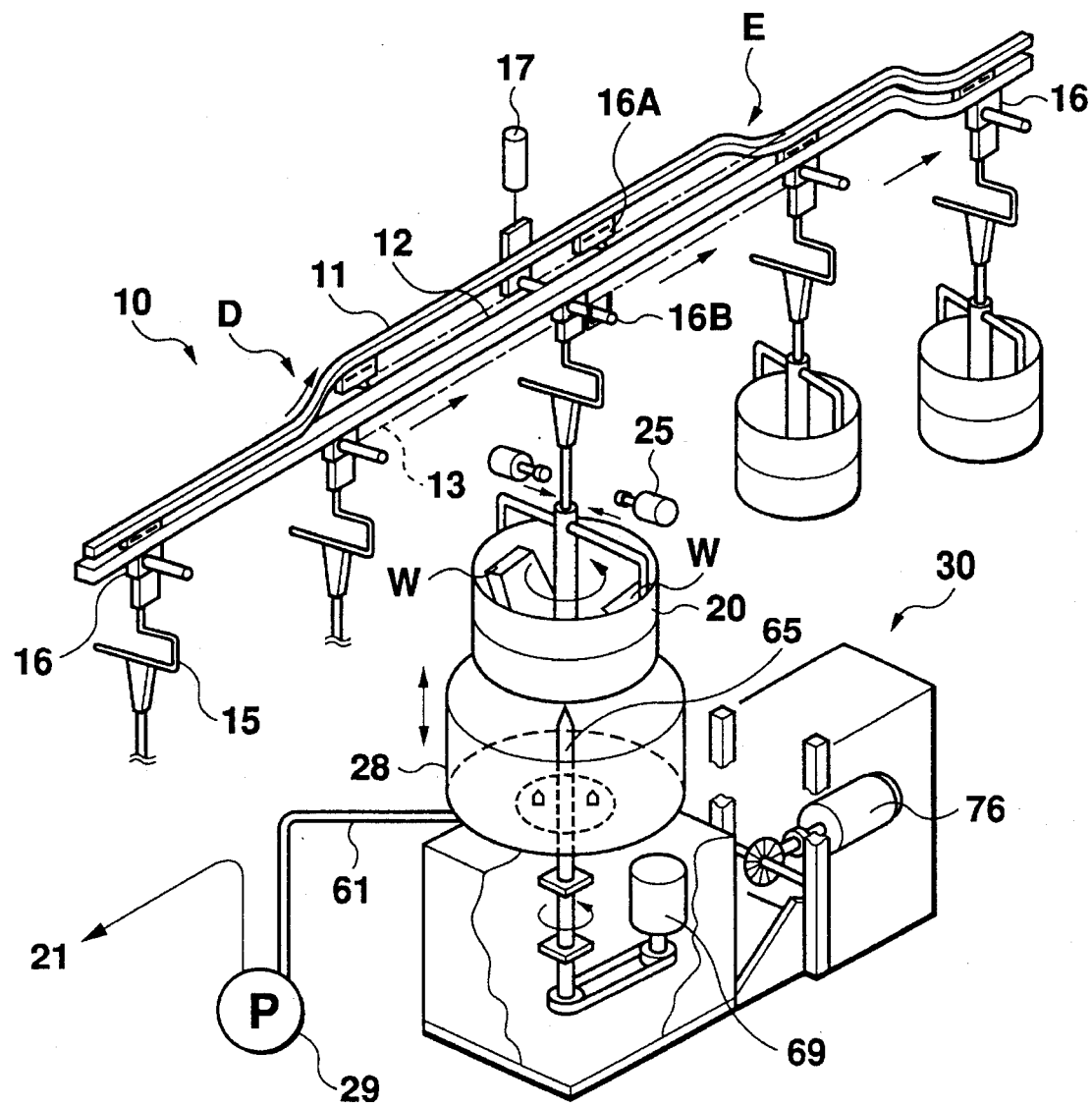
FIG. 3 is a schematic perspective view of the surface treating apparatus according to the present invention.

Referring now to the drawings, wherein like reference characters designate like or corresponding parts throughout the views and thus the repeated description thereof can be omitted for brevity, there is shown in FIGS. 2 and 3 one embodiment of a surface treating apparatus according to the present invention, which is built in a part of a surface treating line of a heat exchanger. Of course, the same structure as the surface treating apparatus can be built in other parts not shown in FIGS. 2 and 3.

In the drawings, objects to be treated, heat exchangers W, are contained in baskets 20 which are hung from a continuous trolley conveyer 10 of a power and free type by hangers 15 of an overhead type. By using the continuous trolley conveyer 10, the heat exchangers W are successively treated in processes of acid dissolution, water washings, a chemical conversion treatment, water washings, and a hydrophilic coating treatment. The continuous trolley conveyer 10 of the power and free type is comprised of a main conveyer 11 to be run at a fixed speed by a motor and a sub-conveyer 12 to be run in parallel with the main conveyer 11, for carrying out a centrifugal separation.

More specifically, the heat exchangers W contained within each basket 20 are immersed into a first treating liquid bath, a water washing treating liquid bath 21 and are passed therethrough while each basket 20 is hung from the main conveyer 11 via a clamp 16 and the hanger 15. When the clamp 16 arrives at a point D, a hanger attach-detach conveyer 13 is operated to separate a second member 16B from a first member 16A of the clamp 16. Since the first member 16A is fixed to the main conveyer 11, the first member 16A is moved together with the main conveyer 11 as it is. On the other hand, the second member 16B is carried on the sub-conveyer 12 located at a lower height than the main conveyer 11 after the second member 16B is separated from the first member 16A and the sub-conveyer 12 is moved at a faster speed than the main conveyer 11. By the function of a sensor 17, the second member 16B is moved to the hanger attach-detach conveyer 13 and is stopped at a predetermined centrifugal separation position. Then, pistons of two cylinders 25 arranged on both sides of the hanger 15 are extended to contact with the side surfaces of the hanger 15 so as to prevent a rolling of the hanger 15 in the left and right side directions.

Now, a geared motor 76 of a centrifugal separator 30 is operated to raise a centrifugal separator body 28. A central engaging shaft 65 as a rotary shaft secured to the center of the centrifugal separator body 28 is engaged with a central concave groove or hole 52 vertically positioned along a central axis of each basket 20, as clearly shown in FIG. 4. Now, when a drive motor 69 for driving the central engaging shaft 65 is driven, the basket 20 containing the heat exchangers W is rotated and thus the treating liquid attached to the heat exchangers W in the previous process can be removed by the centrifugal force. The dropped treating liquid is collected into a collector vessel 60 of the centrifugal separator body 28 and the collected liquid is discharged and returned from the bottom of the collector vessel 60 to the treating liquid bath 21 in the previous process through a hose 61 attached to the bottom of the collector vessel 60.

After the liquid removal is finished by the rotation of the basket 20 for a predetermined time, the drive motor 69 is stopped and the rotation of the basket 20 is stopped. Then, the geared motor 76 is operated to drop the centrifugal separator body 28 to its original position and the two cylinders 25 are also operated to retreat the pistons contacted with the side surface of the hanger 15 to their original positions. The hanger attach-detach conveyer 13 is operated to move forward the second member 16B, and, when the second member 16B reaches a point E, the second member 16B is combined again with the first member 16A. Thus, the basket 20 containing the heat exchangers W is moved to a second treating liquid bath 22 by the main conveyer 11.

Figure 4:
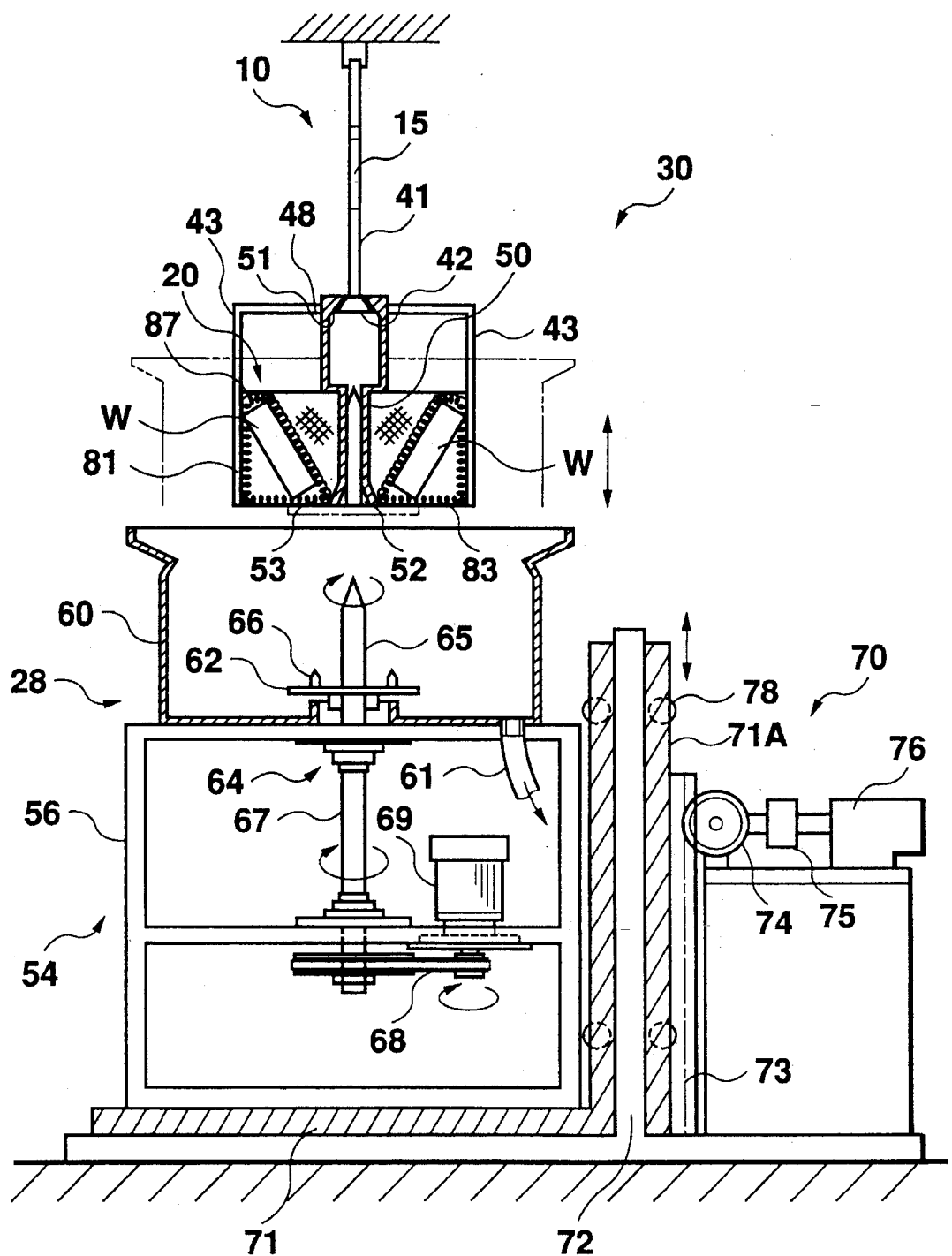
FIG. 4 is a longitudinal cross sectional view of a centrifugal separator according to the present invention.

FIG. 4 illustrates the whole structure of the centrifugal separator 30. A continuous trolley conveyer 10 of the overhead type is equipped on the ceiling of the factory and is moved in the left and right side directions. A plurality of hangers 15 are attached to the continuous trolley conveyer 10 of the power and free type and each basket 20 is hung from the lower end of a C-shaped neck hanger 41 mounted to each hanger 15.

The basket 20 is formed in a cylindrical form and its side wall is formed by a perforated plate or the like. A cylindrical connection member 48 is mounted to the central upper part of the basket 20. In the upper end of the cylindrical connection member 48, a conical hole 51 expanding in the downward direction is formed. At the lower end of the C-shaped neck hanger 41, a conical receiver member 42 spreading in the end direction is provided. The conical receiver member 42 of the C-shaped neck hanger 41 is engaged with the conical hole 51 of the cylindrical connection member 48. Hence, the basket 20 is hung from the conical receiver member 42 of the C-shaped neck hanger 41 so as to freely rotate in the horizontal plane. In order to improve the support stability of the basket 20 when the basket 20 is conveyed by the continuous trolley conveyer 10 of the power and free type, a pair of reinforcing arms 43 extend downwards from the upper end of the cylindrical connection member 48 and are connected with the external periphery of the basket 20.

A central cylinder member 50 is mounted to the bottom of the basket 20 so as to extend upwards from the center of a bottom plate 83 and a plurality of receiver holes 53 for receiving set pins 66 are formed on a certain circle of the bottom plate 83. The heat exchangers W are mounted within the basket 20 to lean against a cylindrical side wall 81 and are covered by flexible nets 87 to be held in their positions. Hence, even when the continuous trolley conveyer 10 is run, the heat exchangers W mounted on the basket 20 can be held in the stable state. Also, while the heat exchangers W are contained in the basket 20, the heat exchangers W can be immersed in the various treating liquids and the treating liquids can be sprayed onto the heat exchangers W.

A centrifugal separation treating device body 54 is provided with a lift table 71 for lifting the centrifugal separation treating device body 54 in the lower part. A body frame 56 is placed on the lift table 71 and the collector vessel 60 for collecting the dropped liquid is mounted on the body frame 56. A rotary drive mechanism 64 is arranged within the body frame 56 and the collector vessel 60. The collector vessel 60 possesses a size larger than the basket 20 and its top end is expanded outwards in the tapered form. In fact, the bottom of the collector vessel 60 is formed so as to be inclined downwards to the moving direction of the continuous trolley conveyer 10 and an outlet for the liquid collected by the centrifugal separation is formed in the lowermost part of the bottom and is coupled with the hose 61.

A rotary plate 62 of the rotary drive mechanism 64 is mounted to the internal center of the collector vessel 60 and the central engaging shaft 65 projects upwards through the center of the rotary plate 62. A plurality of set pins 66 having a shorter length than that of the central engaging shaft 65 project upwards from the periphery of the central engaging shaft 65. The central engaging shaft 65 is adapted to be inserted into the central hole 52 within the central cylinder member 50 of the basket 20 and the set pins 66 are inserted into the receiver holes 53 of the basket 20. The rotary plate 62 penetrates the bottom of the collector vessel 60 and is connected with a drive shaft 67 which vertically extends within the body frame 56. The drive shaft 67 is connected with the drive motor 69 provided in the body frame 56 via a belt-pulley mechanism 68. As a result, by driving the drive motor 69, the rotary plate 62 and the central engaging shaft 65 along with the set pins 66 are driven and rotated.

Adjacent to the centrifugal separation treating device body 54, a lift mechanism 70 for lifting the centrifugal separation treating device body 54 is arranged. One end of the lift table 71 constitutes a slide part 71A which extends in the vertical direction so as to hold a guide post 72 extending in the vertical direction from both sides, and a plurality of slide rollers 78 are mounted to the side surfaces of the slide part 71A. A rack is secured to the external side of the slide part 71A so as to engage with a pinion 74. The pinion 74 is coupled with the geared motor 76 via an adapter 75. As a result, by driving the geared motor 76, the pinion 74 is rotated to move the rack 73 in the vertical direction and to raise or lower the lift table 71 and thus the centrifugal separator body 28 is moved in the vertical direction. Next, the operation of the centrifugal separator 30 described above will be described.

While the heat exchangers W are contained within the basket 20, the basket 20 is hung from the C-shaped neck hanger 41 connected to the hanger 15 mounted to the continuous trolley conveyer 10 of the power and free type. after the basket 20 is treated with the treating liquid by, for example, immersing in the treating liquid bath, when the basket 20 is positioned directly above the centrifugal separation treating device body 54, the continuous trolley conveyer 10 is temporarily stopped. Then, the lift mechanism 70 is operated to raise the body frame 56 and, as shown by two-dotted line in FIG. 4, the collector vessel 60 surrounds the basket 20 so as to wrap the same. The basket 20 is placed on the rotary plate 62 and the central engaging shaft 65 of the rotary drive mechanism 64 is inserted into the central hole 52 positioned in the center of the basket 20. At the same time, the set pins 66 on the rotary plate 62 are inserted into the receiver holes 53 of the basket 20.

Now, when the rotary plate 62 is further raised up a little more from the contact position of the rotary plate 62 with the basket 20, the basket 20 is raised up a little by the rotary plate 62 and the engagement of the conical receiver member 42 of the C-shaped neck hanger 41 with the conical hole 51 of the cylindrical connection member 48 is completely released. Accordingly, when the basket 20 is rotated in the next stage, no large friction resistance of the engagement between the conical receiver member 42 and the conical hole 51 of the cylindrical connection member 48 is caused and no rotating force is transmitted to the C-shaped shaped neck hanger 41 from the cylindrical connection member 48. Hence, this is a preferable method. Further, by providing a bearing in an intermediate portion of the C-shaped shaped neck hanger 41, even when a friction resistance is caused between the engagement between the conical receiver member 42 and the cylindrical connection member 48, a loading on the C-shaped neck hanger 41 or the continuous conveyer of a power and free type 10 can be prevented.

After the basket 20 is located in the predetermined position, as described above, the drive motor 69 is driven. When the central engaging shaft 65 along with the set pins 66 are rotated, the basket 20 engaged therewith is also rotated. In this case, since the basket 20 is separated from the C-shaped neck hanger 41, even when the basket 20 is rotated, no trouble is caused with the C-shaped neck hanger 41. At this time, if there is only the engagement between the central engaging shaft 65 and the central hole 52 of the basket 20, it may be possible to slip these two members with each other. However, in this case, since the set pins 66 are also engaged with the receiver holes 53 of the basket 20, no slip of the engagement between the central engaging shaft 65 and the basket 20 can be caused and thus the basket 20 can be exactly rotated without slipping.

Hence, by the rotation of the basket 20, the excessive treating liquid attached to the heat exchangers W within the basket 20 is removed by the centrifugal separation and the scattered treating liquid flows along the internal wall and the bottom of the collector vessel 60 to collect the discharged treating liquid through the hose 61. When the centrifugal separation is completed, the lift mechanism 70 is operated to lower the lift table 71 and the central engaging shaft 65 and the set pins 66 of the rotary drive mechanism 64 are disengaged from the central hole 52 and the receiver holes 53 of the basket 20. The collector vessel 60 is also moved downwards away from the basket 20 and the basket 20 is hung again from the C-shaped neck hanger 41. The basket 20 containing the heat exchangers W is started to be conveyed again by the continuous trolley conveyer 10 to move to the next process.

Figure 5:
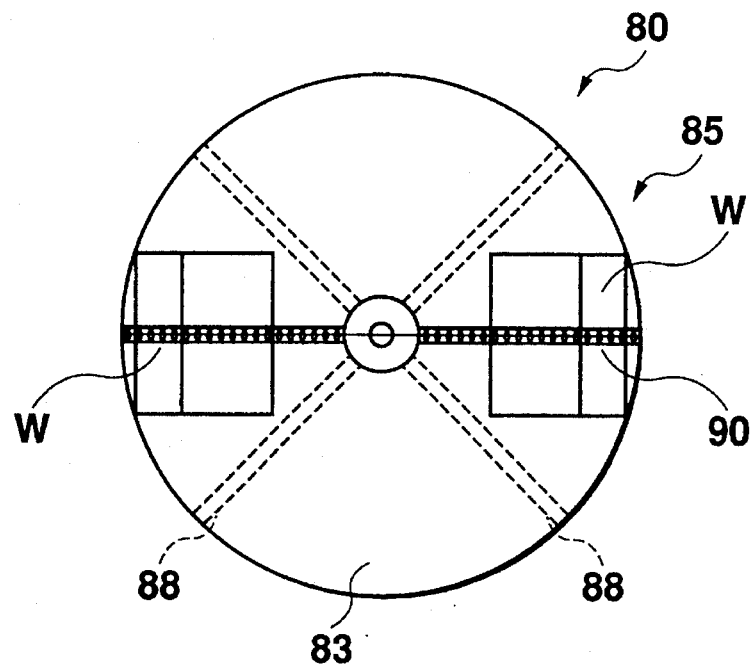
FIG. 5 is a plan view of another embodiment of a basket for rotation according to the present invention.
Figure 6:
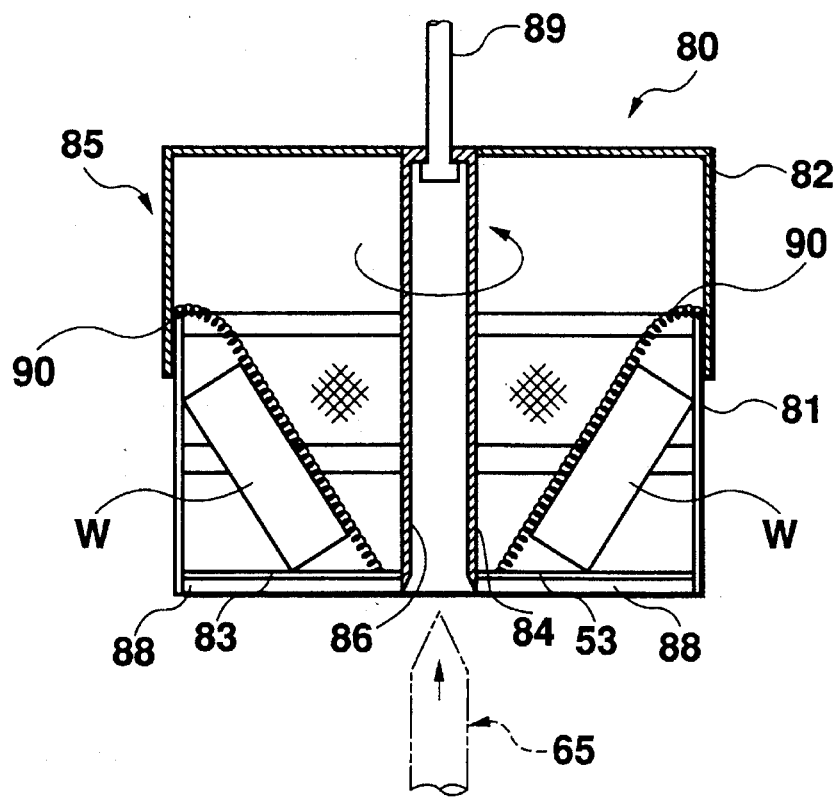
FIG. 6 is a longitudinal cross sectional view of the basket shown in FIG. 5.

In FIGS. 5 and 6, there is shown another embodiment of a basket to be applied to the centrifugal separator according to the present invention.

In this embodiment, a basket 80 for rotating is provided with a casing 85 which includes a cylindrical side wall 81 composed of a porous material having a liquid permeable property, a detachable top cover 82 from the side wall 81, and a bottom plate 83 integrally formed with the side wall 81. A central cylinder member 84 extends in the vertical direction from the center of the bottom plate 83 of the casing 85 and a central concave groove or hole 86 for receiving a central engaging shaft 65 as a rotary shift is formed within the central cylinder member 84. A pair of reinforcing ribs 88 crossing with each other are secured to the lower surface of the bottom plate 83.

When the basket 80 is used, the top cover 82 is removed and a suitable number of heat exchangers W are put into the casing 85 and the heat exchangers W are held so as to prevent movement thereof by using flexible fixing bands 90 which are extended from the central portions of the bottom plate 83 to the upper end portions of the side wall 81 so as to contact with the heat exchangers W, as shown in FIGS. 5 and 6. In this state, even when the basket 80 is conveyed by driving the conveyer, the heat exchangers W contained in the basket 20 can be prevented from damage or breakdown by the fall down or from the mutual collision in the moving and the centrifugal separation.

Figure 7:
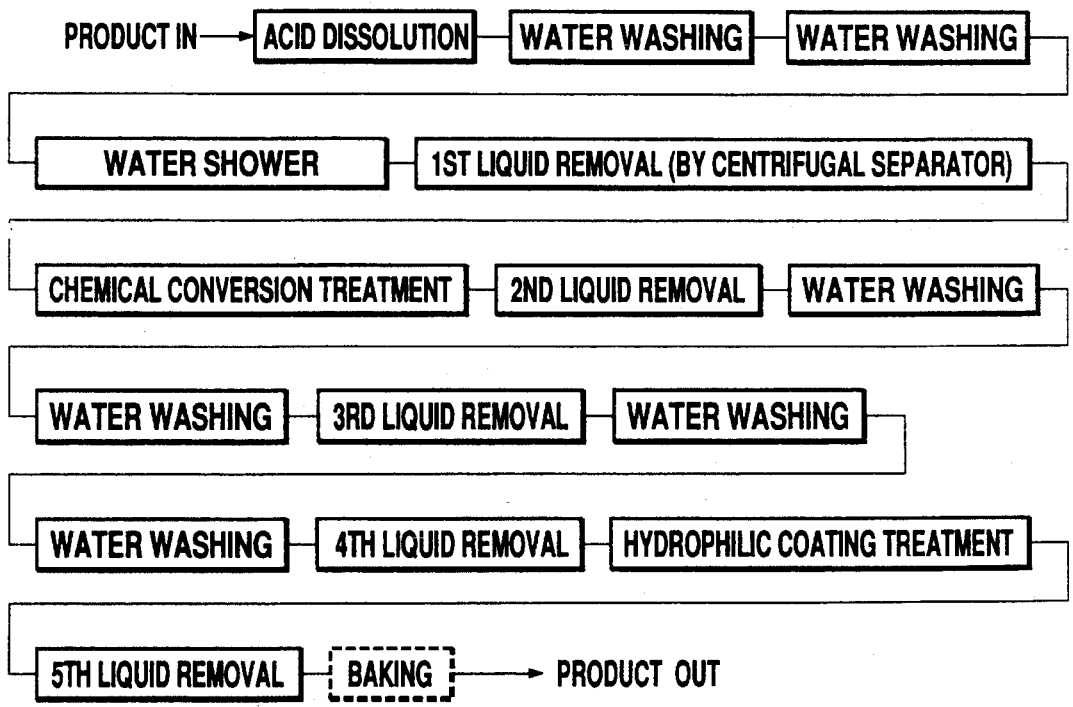
FIG. 7 is a flow diagram of one embodiment of a surface treating process according to the present invention.

FIG. 7 shows one embodiment of a line structure applied to the surface treating method according to the present invention. In this case, among the continuous processes for treating the objects, five liquid removal processes by the centrifugal separation according to the present invention are inserted. The number of processes is varied depending on the size and kind of the objects to be treated and thus the number of liquid removal processes can also be properly selected.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

EXAMPLES

In order to ensure the effects of the centrifugal separation method according to the present invention, the present method was carried out in comparison with a conventional method.

Comparative Example

For a hydrophilic coating liquid bath, a water-soluble hydrophilic coating SURFALCOAT 860 (Trade Name: produced by Nippon Paint Co., Ltd.) was prepared so that its nonvolatile component in the bath was 5.5%. By using this bath, in processes of acid dissolution, water washing, chromating, water washing, hydrophilic coating treatment and baking, an evaporator of a laminate type was treated to form a hydrophilic coated film in a conventional manner. Usually, the baking was executed at 180° C. for approximately 10 minutes.

In the obtained film, a lower layer part of fins of a heat exchanger at the baking stage was thick, and in a lower part, the film forms a bridge between a part of the fins. Also, in the upper layer part of the heat exchanger, particularly, to the internal fins, only a thin film was formed, and the hydrophilic coated film was formed in a very much uneven state depending on parts of the fin surface of the heat exchanger as an object to be treated.

Example 1

A liquid removal by a centrifugal separation (maximum rotation speed: approximately 320 r.p.m. for 5 seconds, total operation time: 15 seconds) was carried out among the processes from the water washing to the hydrophilic coating treatment, and the others were performed in the same manner as the Comparative Example to form the hydrophilic coated film. In the centrifugal separation, a hanger with a cylindrical basket having a diameter of approximately 70 cm was used. After the water washing process, the hanger was moved from a main conveyer to a sub-conveyer and was moved at a high speed, and after the hanger was stopped at a predetermined position, the centrifugal separation was carried out. Then, the hanger was moved from the sub-conveyer to the main conveyer at the high speed and the hanger was returned to the original hanger position of the main conveyer.

The obtained film was thick on the whole, particularly, the lower layer part of the fins of the heat exchanger at the baking stage was thick, and in the lower part, the film forms the bridge between the part of the fins. The hydrophilic coating was formed in an uneven state depending on the parts of the fins of the heat exchanger.

Example 2

The liquid removal by the centrifugal separation was carried out between the processes of the hydrophilic coating treatment and the baking, and the others were performed in the same manner as Example 1 to form the hydrophilic coating film.

The obtained film was thin on the whole, particularly, the film of the internal part of the heat exchanger was thin. Also, by continuously carrying out the treatment in this state, the liquid surface of the hydrophilic coating liquid bath was raised, and the nonvolatile component in the hydrophilic coating liquid bath was lowered. As a result, the concentration of the hydrophilic coating agent can not be maintained to 5.5%.

Example 3

The liquid removal by the centrifugal separation was carried out not only among the processes from the water washing to the hydrophilic coating treatment in Example 1 but also between the processes of the hydrophilic coating treatment and the baking in Example 2.

The obtained film was uniform in thickness and a difference of the film thickness between the upper and lower parts and the internal and external sides of heat exchanger could hardly be detected. Also, by continuously carrying out the treatment in this state, the liquid surface of the hydrophilic coating liquid bath is lowered, but since a supply of the hydrophilic coating agent can be made possible, the concentration of the hydrophilic coating agent in the bath can be maintained to 5.5%.

What is claimed is:

1. A continuous surface treating method for treating a fabricated heat exchanger hung from a hanger of an overhead type on a continuous conveyer comprising a main conveyer and a sub-conveyer, comprising:

a liquid exposure step wherein at least a first liquid is applied to the heat exchanger;

a step for moving the hanger from the main conveyer to the sub-conveyer;

a step for stopping the hanger after the hanger is moved from the main conveyer to the sub-conveyer;

a liquid removal step for carrying out removal from the heat exchanger of an excessive amount of a residue liquid remaining with the heat exchanger as a result of the liquid exposure step by centrifugal separation while rotating the heat exchanger, and a step for returning the hanger from the sub-conveyer to the main conveyer by moving the hanger.

2. The method of claim 1, wherein said liquid exposure step comprises carrying out an acid bath and a first water washing on an object to be treated, the first water washing being carried out following the acid bath, and the acid bath and the first water washing both preceding said liquid removal step.

3. The method of claim 2, wherein said liquid exposure step additionally comprises:

carrying out a chemical conversion treatment of said object following said acid bath and said first water washing; and carrying out a second water washing of said object following the chemical conversion treatment, the chemical conversion treatment and the second water washing both preceding said liquid removal step.

4. The method of claim 3, wherein said liquid exposure step further comprises carrying out a hydrophilic coating treatment of the object to form a hydrophilic coated film on the object, the hydrophilic coating treatment following said chemical conversion treatment and said second water washing, and preceding said liquid removal step.

5. The method of claim 1, wherein said liquid exposure step additionally comprises:

carrying out a chemical conversion treatment of said object; and carrying out a water washing of the object following the chemical conversion treatment, the chemical conversion treatment and the water washing both preceding said liquid removal step.

6. The method of claim 1, wherein said liquid exposure step further comprises carrying out a hydrophilic coating treatment of the object to form a hydrophilic coated film on the object.

7. A continuous surface treating apparatus for carrying out surface treatment of a fabricated heat exchanger hung from a hanger of an overhead type in processes of an acid bath, a first water washing following the acid bath, a chemical conversion treatment following the first water washing, a second water washing following the chemical conversion treatment, and a hydrophilic coating treatment following the second water washing, by using a continuous conveyer, comprising:

a continuous conveyer including a main conveyer and a sub-conveyer;

hanger attach/detach conveying means for moving the heat exchanger along the sub-conveyer;

centrifugal separating means for carrying out removal of liquid from the heat exchanger by centrifugal separation while the heat exchanger is rotated; and positioning means for stopping the heat exchanger at a position along the sub-conveyer at which the centrifugal separating means can accomplish the centrifugal separation.

8. The apparatus of claim 7, wherein said centrifugal separating means is arranged so as to be utilized after the first water washing.

9. The apparatus of claim 7, wherein said centrifugal separating means is arranged so as to be utilized after the second water washing.

10. The apparatus of claim 7, wherein said centrifugal separating means is arranged so as to be utilized after the hydropholic coating treatment.

11. The apparatus of claim 6, wherein said centrifugal separating means is arranged so as to be utilized after each of the acid bath of the object, the chemical conversion treatment, and the hydrophilic coating treatment.

12. A centrifugal separator apparatus for carrying out centrifugal separation of liquid from an object to be treated in a traveling path of a continuous conveyer, comprising:

a basket for containing the object, which is hung from the continuous conveyer via a rotary joint mounted in a top end of the basket; and a centrifugal separation treating device body for carrying out the centrifugal separation, which is arranged in an opposite position to the basket so as to be detachably connected with the basket, the basket including a concave groove extending in a central axis direction of the basket, the centrifugal separation treating device body including:

rotary drive means having a rotary shaft to be engaged with the concave groove of the basket and a driver for driving the rotary shaft;

liquid collecting means to surround the basket for collecting the liquid separated from the object by the centrifugal separation; and lifting means for lifting the rotary drive means and the liquid collecting means together.

13. The apparatus of claim 12, wherein a centrifugal separator is arranged after a water washing of said object.

14. The apparatus of claim 12, wherein a centrifugal separator is arranged after a chemical conversion treatment of said object.

15. The apparatus of claim 12, wherein a centrifugal separator is arranged after a hydrophilic coating treatment of said object.

16. The apparatus of claim 11, wherein a plurality of centrifugal separating treating device bodies are arranged respectively after each of an acid bath of said object, a chemical conversion treatment of said object, and a hydrophilic coating treatment of said object.

17. The apparatus of claim 12, wherein a centrifugal separator is arranged after an acid bath of said object.

18. A rotatable basket for use in centrifugally separating liquid from at least one object contained therein, comprising:

a casing for containing said object, the casing having a cylindrical side wall part composed of a porous material and a bottom part integrally formed with the side wall part;

a cylindrical concave groove part extending in a vertical direction from a center of the bottom part of the casing; and a flexible net mounted to an internal surface of the side wall part of the casing for holding said object.

19. A rotatable basket for use in centrifugally separating liquid from at least one object contained therein, comprising:

a casing for containing at least one object, the casing having a cylindrical side wall part composed of a porous material, a top cover detachable from the side wall part and a bottom part integrally formed with the side wall part;

a cylindrical concave groove part extending in a vertical direction from a center of the bottom part of the casing; and a fixing band extending from a central portion of the bottom part of the casing to an upper end of the side wall part of the casing to contact with said object.

* * * * *